July 14, 1953 P. M. RIEDE 2,645,241
VALVE FOR GAS PRESSURE CYLINDERS
Filed July 10, 1947
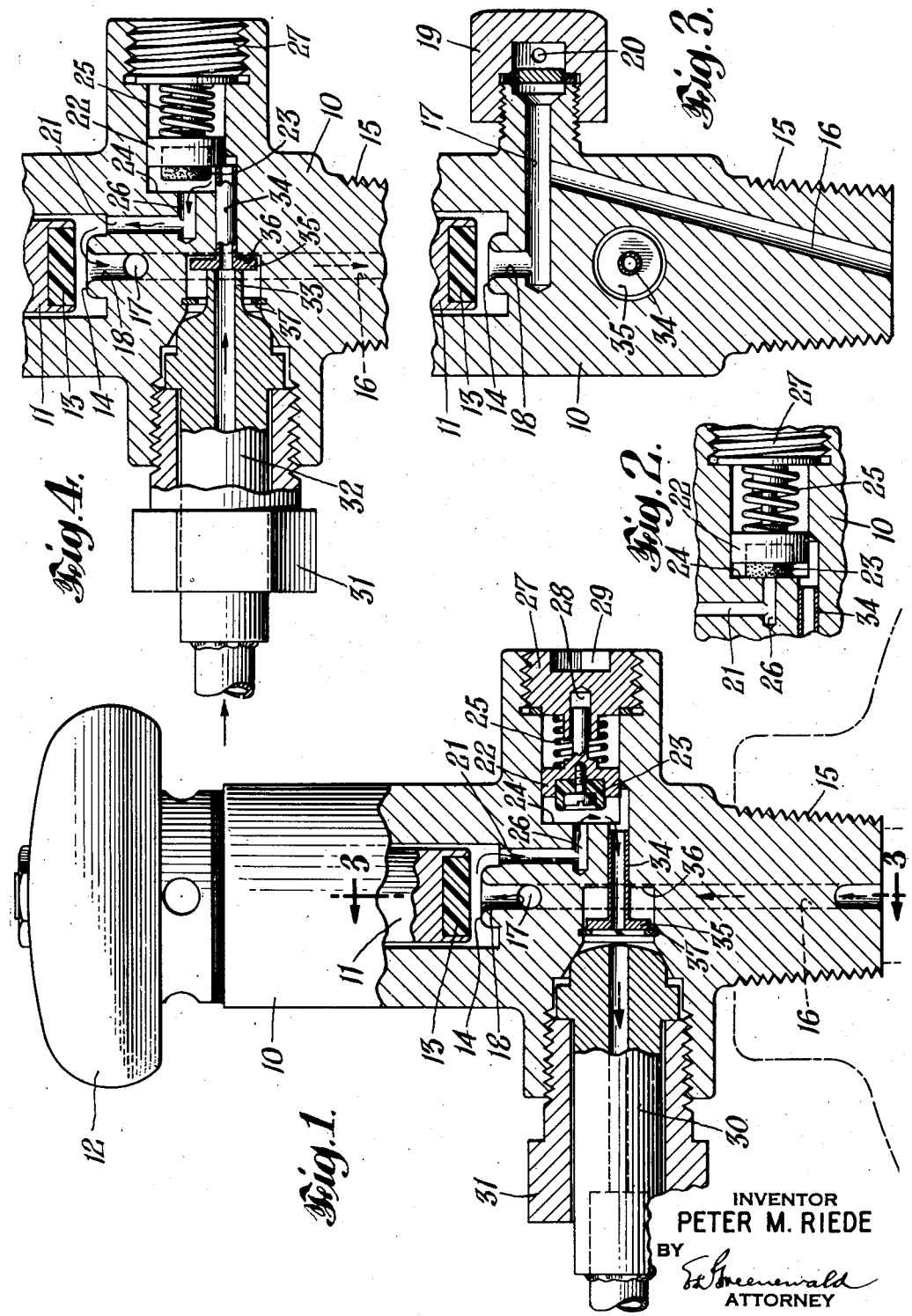
INVENTOR
PETER M. RIEDE
BY
ATTORNEY Patented July 14, 1953

2,645,241

UNITED STATES PATENT OFFICE 2,645,241

VALVE FOR GAS PRESSURE CYLINDERS

Peter M. Riede, Kenmore, N. Y., assignor, by mesne assignments, to Union Carbide and Carbon Corporation, a corporation of New York Application July 10, 1947, Serial No. 759,973

6 Claims. (Cl. 137—235)

This invention relates to valves for gas pressure cylinders and has for an object to provide a shut-off valve for such a cylinder and in addition a check valve which will at all times, except when the cylinder is being filled, maintain the pressure within the cylinder greater, by a predetermined amount, than the pressure at the shut-off valve outlet so that in normal use a cylinder may not be emptied entirely but will always retain at least a small residual charge of gas. Another object is to provide such a pressure responsive check valve within the housing for the usual shut-off valve. A further object is to provide such a check valve which will be inaccessible to the customer but may be opened by the manufacturer or service organization for refilling the cylinder. Still another object is to locate this check valve inconspicuously within the housing of the usual shut-off valve and between the discharge connection and the shut-off valve so that the check valve may be removed for inspection or service without emptying the cylinder.

Certain industrial gases sold in cylinders must be in a nearly dry condition. Two of these gases are argon and oxygen. The maximum amount of moisture that is permitted in argon to be used for welding is 9 grains per 1000 cubic feet. For breathing oxygen for use in aircraft the maximum permitted is 15 grains per 1000 cubic feet. This requirement is difficult of fulfillment in the ordinary cylinder in which these gases are usually supplied. This is the case even though the empty cylinder may be purged of residual gas by a vacuum pump before filling, because more than this amount of moisture may be retained in the cylinder if the shut-off valve of the empty cylinder had been left open. As a result, extensive precautions have had to be taken at the filling plant to make sure the cylinder is not only exhausted of gas but is also satisfactorily dried out before it is recharged.

According to this invention, the tedium of having to exhaust and dry out the cylinder each time it is to be filled has been eliminated by the provision of a check valve operating to open only in response to a predetermined low but superatmospheric gas pressure, say 25 pounds per square inch gauge, within the cylinder. In this way, no air or moisture gets into the cylinder as might occur if the cylinder contents were reduced to atmospheric pressure by leaving the cylinder outlet passage open for ingress of air. The check valve is located between the usual cylinder shut-off valve and the gas delivery outlet of the valve housing, so that even if such shut-off valve is left open accidentally the check valve still functions to close the gas outlet passage when the pressure in the cylinder has fallen to the desired amount. By locating the check valve on the outlet side of the usual shut-off valve it will be possible to inspect or service the check valve without having to empty the cylinder. More specifically, this check valve is inconspicuously embodied within the housing of the usual shut-off valve and so arranged that the customer or user of the gas is unable to control the check valve and completely empty the cylinder of residual gas, but gas distributors or service organizations are readily able to open the check valve for refilling.

Referring to the drawing:

Fig. 1 is a longitudinal view partly in section of a preferred embodiment of this invention showing the automatic or pressure responsive check valve in open position;

Fig. 2 is a detail of a portion of Fig. 1 showing the check valve in closed position;

Fig. 3 is a section on the line 3—3 of Fig. 1;

Fig. 4 is a view corresponding to a portion of Fig. 1 but showing the parts in position for refilling or recharging the cylinder.

The body or housing 10 for the usual cylinder shut-off valve 11 is provided with a handwheel 12 at the top by means of which the valve is opened or closed. The valve seat 13 is of any suitable material but preferably is of a synthetic plastic or rubber-like material, the seat being moved into cooperation with the stationary nozzle portion 14 for closing the valve. A threaded projection 15 is adapted for screw threaded engagement within the neck of the usual gas pressure cylinder indicated by the dotted line in Fig. 1. Egress of gas from the cylinder is from the passage 16, the horizontal passage 17 (see Fig. 3) and the vertical passage 18 to the nozzle 14. Some appropriate means of safety pressure relief such as a bursting disc is mounted within the nut 19. In case of dangerously excessive pressure the gas escapes through the orifice 20.

After passing the valve 11, egress of cylinder gas takes the path shown by the arrows in Fig. 1, the same being down the vertical passage 21 when the pressure of the gas forces the check valve stem 22 to the right, compressing the spring 25. The seat material 23 is carried by the slidable check valve stem 22. When the check valve is closing, the check valve stem 22 moves to the left until the seat 23 makes contact with the abutment wall 24 around the horizontal passage 26. A nut 27 is provided with an axial recess 28 for guiding the rod or stem of the sliding check valve stem 22. The nut is provided on its outer face with a recess 29 of appropriate shape to receive a wrench by means of which the nut is inserted or removed.

After passing the spring actuated check valve 23 the egress of gas from the cylinder is as shown by the arrows through the discharge nipple 30 which is held in place by the nut 31. For refilling the gas pressure cylinder a differently shaped nipple 32 is provided with an extension 33 as shown in Fig. 4. When the valve 11 is open and the nipple 32 is seated against the tapered portion of the bore, the extension 33 engages a tubular plunger 34 which in turn engages check valve stem 22 and holds open the valve 23 carried by said check valve stem 22, allowing gas supplied through the nipple 32 to pass through the plunger, thence through the passages 18, 17, and 16 into the cylinder. As shown in Figs. 1 and 4, the left end of the plunger 34 is provided with a flange 35 contacted by the extension 33 of the recharging nipple 32, and movement of the plunger 34 to the right is limited by a bevelled stop or shoulder for the recharging nipple and by the length of the extension 33, the spring 25 urging the piston into contact with the end of the plunger. In event the extension 33 should be too long, and to prevent the plunger compressing the spring 25 an excessive amount or taking the thrust on parts not intended for that purpose, an abutment wall 36 around the plunger passage limits inward travel of the flange 35 and plunger 34. When not refilling, a stop or abutment 37 constituted by a split ring inserted in a groove serves to limit outward movement of the plunger and flange.

To discharge gas from the cylinder, the attached valve mechanism is operated by the user of the gas in the customary way, namely, by controlling the egress of gas from the cylinder by means of the shut-off valve 11 upon turning the handwheel 12. Normally, when no gas is being discharged, the valve 11 is closed, the seat 13 being against nozzle 14. Upon opening the valve 11 the pressure of the gas from the cylinder forces the check valve stem 22 to the right, compressing the spring 25. The egress of gas is as illustrated by the arrows in Fig. 1, the spring actuated check valve 23 staying open as long as the gas pressure in the cylinder is sufficient to hold it open. When the pressure in the cylinder has fallen to a predetermined value slightly above atmospheric pressure, such as say 25 pounds per square inch gauge, then the pressure of the spring 25 is sufficient to close the check valve by pressing the seat 23 against the abutment wall 24. Thus, egress of gas from the cylinder is stopped by the automatic closing of the discharge passage whether or not the valve 11 may be open. In the event an operator should neglect to close the valve 11 this pressure-responsive check valve automatically closes to prevent air and moisture getting into the cylinder and thereby avoiding the need of the exhausting and drying processes heretofore described.

At the recharging station, instead of the discharge nipple 30 the nipple 32 is inserted. The nipple 32 has an extension 33 thereon which pushes the plunger 34 inwardly (to the right) opening the check valve 23 by contact with the check valve stem 22 and thus enabling gas to flow into the cylinder according to the arrows shown in Fig. 4. When the cylinder has been refilled to the desired amount, the valve 11 is closed, the supply of high pressure gas is turned off, and the refilling nipple 32 is withdrawn, permitting the spring 25 to move the plunger 34 outwardly and to close the check valve 23 by seating it against the abutment wall 24. The filled cylinder is now ready to be shipped. To prevent ready removal of the check valve 23 by loosening the nut 27, a wire and seal may be passed through a small hole in a portion of the nut 27 and housing 10 to prevent the nut being turned without breaking the seal.

I claim:

1. A valve for a fluid pressure cylinder comprising a housing, a portion of the housing being provided with means for the attachment of the housing to said cylinder, a passage in said housing for fluid flow to and from said cylinder, a valve stem extending out of the housing, a handle outside the housing for actuating said stem, a valve seat carried by said stem within the housing for closing said passage, said housing being provided with a discharge opening at an end of said passage for the egress of fluid from said cylinder and housing, a second valve between said discharge opening and first mentioned valve for closing said passage in response to pressure in said passage between said valves below a predetermined and superatmospheric value when the first valve is open, said second valve being provided with means for biasing it to a closed position, and means insertable in said housing for opening and holding said second valve open for charging said cylinder, said last mentioned means including a tubular plunger retained in said housing and shiftable to engage said second valve on charging said cylinder.

2. A valve for a fluid pressure cylinder comprising a housing, a portion of the housing being provided with means for the attachment of the housing to said cylinder, a passage in said housing for fluid flow to and from said cylinder, a valve stem extending out of the housing, a handle outside the housing for actuating said stem, a valve seat carried by said stem within the housing for closing said passage, said housing being provided with a discharge opening at an end of said passage for the egress of fluid from said cylinder and housing, a second valve between said discharge opening and first mentioned valve for closing said passage in response to pressure in said passage between said valve below a predetermined and superatmospheric value when the first valve is open, said second valve being provided with a spring for biasing it to a closed position, and means insertable in said housing for compressing said spring to open and hold open said second valve for charging said cylinder, said last mentioned means including a sliding wall portion of said passage within said housing.

3. In an attachment for a gas pressure cylinder whereby gas pressure above atmospheric is always maintained within said cylinder, a housing provided with means for attaching the same to a cylinder, a gas passage in said housing, a manually controlled shut-off valve for closing said passage, an excess pressure relief mechanism connected to said passage between the cylinder attaching means and said shut-off valve, a pressure responsive valve in said passage on the outlet side of said shut-off valve adapted to close said passage when the gas pressure in said passage between said valves has fallen to a predetermined value, and a manually slidable member for opening said pressure responsive valve and holding the same open when filling the cylinder.

4. An attachment on and in combination with a gas pressure cylinder whereby pressure above the atmosphere is always maintained, a housing provided with means for attaching the same to a cylinder, a gas passage in said housing, a manually controlled shut-off valve for closing said passage, a pressure responsive valve in said passage on the outlet side of said shut-off valve adapted to close said passage when the gas pressure in said cylinder has fallen to a predetermined value, a slidable member within said housing for opening and holding open said pressure responsive valve when filling the cylinder, said pressure responsive valve being located adjacent said manual valve, and abutments for limiting sliding movement of said member, each of said abutments being perforate, one of the abutments having the member slidable therein, and the other abutment having an actuating nipple movable through it.

5. An attachment for a gas pressure cylinder comprising a housing of general cross shape, a threaded stem for reception in the cylinder, a spring pressed valve in one arm of the cross, an outlet passage for gas from the cylinder adapted to be closed by said spring pressed valve when the pressure in the cylinder falls to a predetermined value above atmospheric pressure, a gas connection in the opposite arm of the cross, a gas passage from said cylinder up the stem to above the arms of said cross, then downward to said spring pressed valve, and laterally from said spring pressed valve to the gas connection, a plunger slidable in the arms of said cross for holding said pressure responsive valve open, and a manually controlled valve slidable in the stem portion of said housing above the arms of said cross for closing said gas passage between the cylinder and spring pressed valve whereby said spring pressed valve may be opened without any loss of cylinder gas when said manually controlled valve is closed.

6. An attachment for a gas pressure cylinder comprising a housing of general cross shape, a threaded stem for reception in the cylinder, a spring pressed valve in one arm of the cross, an outlet passage for gas from the cylinder adapted to be closed by said spring pressed valve when the pressure in the cylinder falls to a predetermined value above atmospheric pressure, the opposite arm of the cross being provided with a gas discharge oepning, a gas passage from said cylinder up the stem to above the arms of said cross, then downward to said spring pressed valve, and laterally from said spring-pressed valve to the gas discharge opening, a manually controlled valve slidable in the stem portion of said housing above the arms of said cross for closing said gas passage between the cylinder and spring pressed valve whereby said spring pressed valve may be opened without any loss of cylinder gas when said manually controlled valve is closed, and a member slidable in the laterally extending portion of said gas passage between said gas discharge opening and spring pressed valve for opening the valve and holding it open against the pressure of its spring.

PETER M. RIEDE.

References Cited in the file of this patent

UNITED STATES PATENTS

| Number | Name | Date |
|---|---|---|
| 1,234,726 | Bruckner | July 31, 1917 |
| 1,579,141 | Pierce | Mar. 30, 1926 |
| 2,098,119 | White | Nov. 2, 1937 |
| 2,361,865 | Norway | Oct. 31, 1944 |

FOREIGN PATENTS

| Number | Country | Date |
|---|---|---|
| 789,759 | France | Aug. 26, 1935 |